US009967155B1

(12) United States Patent
Earl et al.

(10) Patent No.: US 9,967,155 B1
(45) Date of Patent: May 8, 2018

(54) DYNAMICALLY CREATING AND ROUTING NETWORK RECORDS FOR DISPATCH PRIOR TO SESSION TIMEOUT

(71) Applicant: Sprint Communications Company L.P., Overland Park, KS (US)

(72) Inventors: Bryson Earl, Altamonte Springs, FL (US); Kevin V. Jadunandan, Palm Bay, FL (US); Robert Dennis Lumpkins, Marietta, GA (US); Brian D. Lushear, Winter Springs, FL (US); P. A. Shinholster, Jr., Orlando, FL (US); Todd M. Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 281 days.

(21) Appl. No.: 14/806,495

(22) Filed: Jul. 22, 2015

(51) Int. Cl.
    *H04L 12/24* (2006.01)

(52) U.S. Cl.
    CPC ...... *H04L 41/5003* (2013.01); *H04L 41/5029* (2013.01); *H04L 41/5032* (2013.01); *H04L 41/50* (2013.01)

(58) Field of Classification Search
    CPC . H04L 41/50; H04L 41/5003; H04L 41/5029; H04L 41/5032
    USPC ........................................ 370/259
    See application file for complete search history.

(56) References Cited

U.S. PATENT DOCUMENTS

| 8,355,316 | B1 | 1/2013 | Lushear et al. | |
| 2003/0177179 | A1* | 9/2003 | Jones | H04L 29/06 709/203 |
| 2006/0074894 | A1* | 4/2006 | Remahl | G06F 17/30867 |
| 2009/0164482 | A1* | 6/2009 | Saha | G06Q 10/06 |
| 2010/0036933 | A1* | 2/2010 | Breau | G06F 17/30873 709/218 |
| 2010/0268782 | A1* | 10/2010 | Zombek | H04L 1/1635 709/206 |
| 2011/0004622 | A1* | 1/2011 | Marson | G06Q 10/06 707/770 |
| 2013/0083210 | A1* | 4/2013 | Beckham | H04N 21/2743 348/207.11 |
| 2014/0075488 | A1* | 3/2014 | Christudass | H04L 41/5058 725/114 |
| 2015/0317611 | A1* | 11/2015 | Tag | G06Q 10/1093 705/5 |

(Continued)

*Primary Examiner* — Michael Thier
*Assistant Examiner* — Rownak Islam

(57) ABSTRACT

A method for dynamically creating and routing custom network records with a server system on a service provider network before session timeout is disclosed according to an embodiment. The server system assembles a custom mapping from a mapping data store, determines that a request corresponds with a quantity of event instances in a network record that exceeds a calculated threshold, and creates the custom mapping within each event instance of a network record while the network record is stored in a records data store. The method includes the server system generating the hierarchy within the custom mapping created at each event instance of the network record, initiating a plurality of threads, and determining, using the plurality of threads, a plurality of event instances based on the request and hierarchy generated. A plurality of custom network records are generated in a staging table stored outside of the records data store.

19 Claims, 10 Drawing Sheets

(56) References Cited

U.S. PATENT DOCUMENTS

| | | | |
|---|---|---|---|
| 2016/0048469 A1* | 2/2016 | Waugh | G06F 13/364 710/241 |
| 2016/0188660 A1* | 6/2016 | Liu | G06F 17/30699 707/723 |

* cited by examiner

DYNAMICALLY CREATING AND ROUTING NETWORK RECORDS FOR DISPATCH PRIOR TO SESSION TIMEOUT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Virtual private networks (VPN) based on MPLS (Multiple Protocol Label Switching) technology can be hosted by a service provider to multiple customers. An MPLS VPN network hosted by a service provider may allow for confidential communication between clients and across remotely located computing locations. While traversing the network, communications may travel via different paths through different network nodes and devices, depending on the availability of a given device at a given time. Network equipment, such as probes, may gather and/or generate raw data used to create a recording of events occurring on a network, which in turn can be used in the determination of charges and invoices related to a network subscription.

A subscriber may be billed according to their subscription for the services and/or equipment in use on the network. The subscription can be defined, at least in part, by a service level agreement (SLA). Information generated from network usage is analyzed to determine conformance with the SLA and this information may be requested by the subscriber. The SLA may define thresholds and information related to class of service (CoS) parameters, QoS parameters, a specification of network resource allocation, network service availability guarantees, time to identify the cause of a client-affecting malfunction, historic record keeping, downtime thresholds to repair malfunctions, service and equipment provisioning time, and/or network metrics (such as latency, jitter, etc.). An electronic device's use of a network may cause the generation of a records and data structure, which presents technical computing challenges as the quantity of data increases. A service provider may provide a history of parameters and records to a client for the duration of their subscription, thus contributing to the amount of data handled by a finite amount of back-end computing resources of a network.

SUMMARY

In an embodiment, a system for dynamically creating and routing custom network records on a service provider network before session timeout comprises a server system at the service provider network. The server system comprises a processor communicatively coupled to a non-transitory memory storing an application that, upon execution by the processor, configures at least the server system to assemble a custom mapping from a mapping data store based on a client identifier included in a request, where the custom mapping non-uniformly defines a hierarchy data structure. The server system creates the custom mapping within each event instance of a network record while the network record is stored in a records data store, and generates the hierarchy within the custom mapping at each event instance of the network record. The server system determines a plurality of event instances based on the hierarchy generated and the request, and concatenates at least some fields of the plurality of event instances in a staging table that is stored outside of the records data store. Responsive to the concatenation, the server system creates a custom network record based on the request.

In an embodiment, a method is disclosed for dynamically creating and routing custom network records with a server system on a service provider network before session timeout. The method comprises assembling, by the server system, a custom mapping from a mapping data store based on a client identifier included in a request. The custom mapping non-uniformly defines a hierarchy data structure. The method includes creating the custom mapping within each event instance of a network record while the network record is stored in a records data store, and generating the hierarchy within the custom mapping at each event instance of the network record. The method includes determining a plurality of event instances based on the request and the hierarchy generated, and concatenating at least some fields of the plurality of event instances in a staging table that is stored outside of the records data store. Responsive to concatenating, the method includes creating a custom network record based on the request.

In another embodiment, a method is disclosed for dynamically creating and routing custom network records with a server system on a service provider network before session timeout. The method comprises the server system assembling a custom mapping from a mapping data store based on a client identifier included in a request, where the custom mapping non-uniformly defines a hierarchy data structure that is unique to the client identifier. The method includes determining that the request corresponds with a quantity of event instances in a network record that exceeds a calculated threshold. The method continues by creating the custom mapping within each event instance of a network record while the network record is stored in a records data store, and generating the hierarchy within the custom mapping created at each event instance of the network record. The method also includes initiating a plurality of threads in response to determination of the threshold being exceeded, and determining, using the plurality of threads, a plurality of event instances based on the request and the hierarchy generated. The method then includes creating a plurality of custom network records in a staging table that is stored outside of the records data store based on the request and responsive to determining the plurality of event instances.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
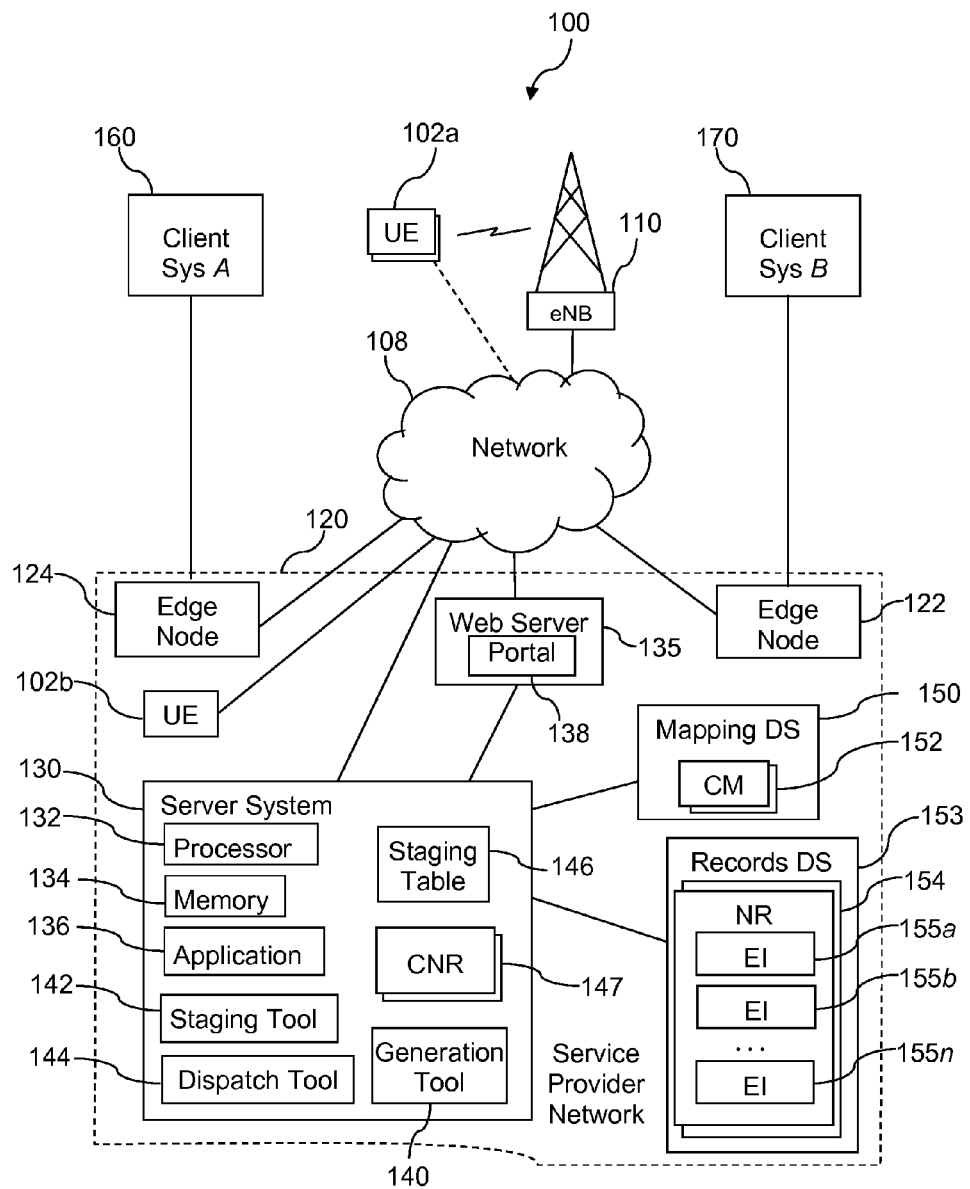
FIG. 1A is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A telecommunications service provider (service provider) can provide customers with a variety of services by hosting a service provider network—such as through the use of multiple protocol label switching technology and a virtual private network. The services offered to customers correspond with network equipment (such as probes executing on nodes of the network) generating records of usage and activity on the service provider network. Each customer may have multiple clients (e.g., a browser or other application configuring user equipment) connected to and executing on the service provider network. When these clients use the service provider network, hundreds, thousands, or even millions of rows of information are generated in a data store. Each row is an event instance about network activities and usage for at least one device on the service provider network. The information corresponding to each event instance is within a network record's data structure and is associated with charges that are billed to a customer for use of the service provider network. The immense quantity of event instances can create routing bottlenecks and processing inefficiencies of back-end servers when only specific data from within network records are requested. In other words, when a customer logs into the service provider network and sends a request to see only certain types of charges or usage for certain equipment, the large quantity of event instances can slow server processing.

For example, a server may receive a request for information pertaining to a customer of the service provider network, specifically seeking networking and/or charge information for value added services (VAS) that use a customer premise equipment virtual private network solution (CPE-based VPN) from the service provider network. When one or more requests are received, servers of the service provider network are tasked with fulfilling the request before session timeout of the connection associated with each request. This presents challenges inextricably tied to computer technology because the hundreds, thousands, or even millions of rows of information can lead to a server querying inapposite data sectors within a record stored in memory of a database prior to responding to a requesting client, thus unduly consuming processor, database, and/or other resources of network equipment. In some instances, the volume of requests and/or handling of the requests can lead to a web portal being temporarily inoperable for the user equipment corresponding with each request, and also cause equipment of the service provider network to be operationally burdened. Moreover, the service provider network may generate and record information multiple times at different points along the network path, thus leading to redundant rows of event instances within network records. This can further slowdown the processing on servers due to the quantitative increase in data structures which may be queried for fulfillment of a request.

Accordingly, it may be desirable to provide a system having the ability to fulfill multiple requests in a concurrent manner through a service provider network. The present disclosure provides embodiments of systems and processes using particular machines that dynamically create, handle, and route custom network records on a service provider network to fulfill client requests before session timeout occurs. Embodiments of the present disclosure include creating a unique hierarchy corresponding to the customer's computing systems (client systems) distributed across the service provider network, and generating custom network records using elements of the unique hierarchy. This allows for interaction through the web portal, modification of search parameters, and improved network access to custom network records.

In order to make event instances locatable, accessible, and/or usable in a calculated time period, a custom mapping for the hierarchy may be created by a server system. For example, the server system may generate the custom mapping that comprises a non-uniform hierarchy related to the organization and association of a customer's computer systems for billing charges, usage, and/or other information about network equipment. A non-uniformly defined hierarchy data structure includes a custom mapping that has level instances which are semi-nested between each other and thus have non-uniform relationships between levels of the hierarchy. This means that an instance of a level may not necessarily have the same parent level (e.g., one instance of level six may have a parent instance at level four, while a different instance of level six may have a parent of level) as another instance of the same level. Thus, the custom mapping non-uniformly defines the hierarchy data structure based on input from a portal and allows for a custom tailored mapping that corresponds to the unique associations within a customer's organization.

The server system may use the custom mapping to identify relevant event instances from among the thousands or millions of event instances without having to query for all of the information requested within the record while the record is stored in a sector on a database. The custom mapping may be built into each event instance by the server system to increase processor efficiency and expedite the speed with which a database is accessed. Thus, specific event instances can be routed to a staging table for creating a custom network record prior to being relayed back to the portal. This allows for specific query and generation of custom network records that comprise information associated with charges, network usage, network parameters, and other information that is presented over the service provider network to fulfill individual requests. The server system also provides tools for the web portal to create custom records and reports based on saving query parameters and changing what is queried from the server system without having to save the data for each report created. This reduces or avoids technological issues related to network throughput and bandwidth usage due to high volume of requests, while also improving processing efficiency.

Turning now to FIG. 1A, a communication system 100 is described. In an embodiment, the system 100 comprises network 108 which is coupled to one or more of user equipment (UE) 102a, 102b, enhanced Node B 110 (eNB), client system A 160, client system B 170, and service provider network 120. The illustrated embodiment of service provider network 120 comprises edge node 122, edge node 124, and server system 130 that may communicate with web server 135, mapping data store 150, and records data store 153. Each edge node 124, 122 is coupled to one or more of client system A 160 and client system B 170, respectively. While illustrated as single elements in FIG. 1A, it is understood that any number of the elements of the present disclosure can be used and alternate and/or additional network routing paths between any of the elements in system 100 are within the scope of the present disclose. The network 108 may comprise one or more public networks, one or more private networks, or a combination thereof.

The server system 130 may be operated by a service provider of the service provider network and comprise at least one server that is a back-end computer system. The server system 130, web server 135, mapping data store 150, and records data store 153 may be located in one computer system, across multiple computers, on separate computers, or in some combination thereof. In some embodiments, the server system 130 may comprise a plurality of computers (e.g. a server farm) that are located at different physical locations, and have engines, applications, tools, modules, data structures, etc. residing with separate servers associated with service provider network 120. Embodiments of computer systems, computing components, and application architecture are discussed in greater detail hereinafter. The server system 130 includes processor 132, memory 134, application 136, generation tool 140, staging tool 142, and dispatch tool 144. Application 136 may comprise and/or call upon tools 140, 142, 144 during interaction within the service provider network 120, as discussed in greater detail with respect to FIG. 1C.

The service provider network 120 may be hosted, at least in part, by a network service provider that allows a business customer to sign up and use the service provider network to connect their computer systems together across different geographic locations and offer services for the customer's computer systems. Although subdivisions of a business may, in some instances, be legally separate entities, the service provider network allows for interconnecting multiple computer systems and allowing the customer to designate the relationships among the devices connected on the service provider network. This can be accomplished by the service provider network comprising a multiprotocol label switching virtual private network (MPLS VPN), which is a network-based internet protocol (IP) VPN available globally across the service provider network. The service provider network 120 may be configured to allow secure VPN connections through intranet connectivity and/or extranet connectivity.

For example, client system A 160 and client system B 170 may comprise separate computer systems and respectively couple to edge nodes 124, 122 so as to have an intranet connection to each other and/or other devices through the service provider network 120. Extranet connectivity includes the ability for a device (e.g., any of UE 102a, 102b, 102c, or 102d) to connect with a service provider network through another network, such as network 108. For example, if an employee travels and loses intranet connectivity on UE 102a, access to the service provider network can still be accomplished by UE 102a communicating with network 108 (e.g., wirelessly via eNodeB 110 and/or a direct connection) by providing authentication credentials.

Service provider network 120 may host a unique instance of a VPN for each customer (i.e., for all of the computer equipment the customer connects to that instance of the VPN), thereby allowing the service provider network 120 to support multiple instances (and thus multiple customers) simultaneously using the same network elements. The service provider network 120 may operate in conjunction with network 108, and thus connectivity for clients may occur over any number of communication paths between networks 108 and 120. Thus, network connections illustrated as a single communication path are merely illustrative, and multiple paths are within the scope of the disclosure. Because the service provider network 120 is fully interconnected, multiple redundant paths are provided to equipment (e.g., 102a, 102b, 130, 135, 160, 170, etc.) as they use the service provider network 120. In order to accommodate multiple instances of the service provider network 120 using MPLS VPN technology, communications across service provider network 120 may proceed via a different communication path at any time depending on factors such as connection availability and/or network throughput.

It is understood that service provider network 120 and/or network 108 may comprise any number of network elements, such as routers, servers, gateways, access points, databases, base stations, NodeB, enhanced NodeB (e.g., eNB 110), and/or other devices in any combination. Embodiments of network 108 may include a core network, a radio access network (RAN), the internet, and or other interconnected wired and/or wireless communication paths for linking packets from one location to another. Although illustrated as being outside the cloud representing network 108, it is understood that, in some embodiments, at least some of the elements in service provider network 120 (e.g., data stores 150, 153 and/or edge nodes 122, 124) could be located inside of the network 108 and/or hosted by a third party provider associated with the service provider network.

Figure 1B:
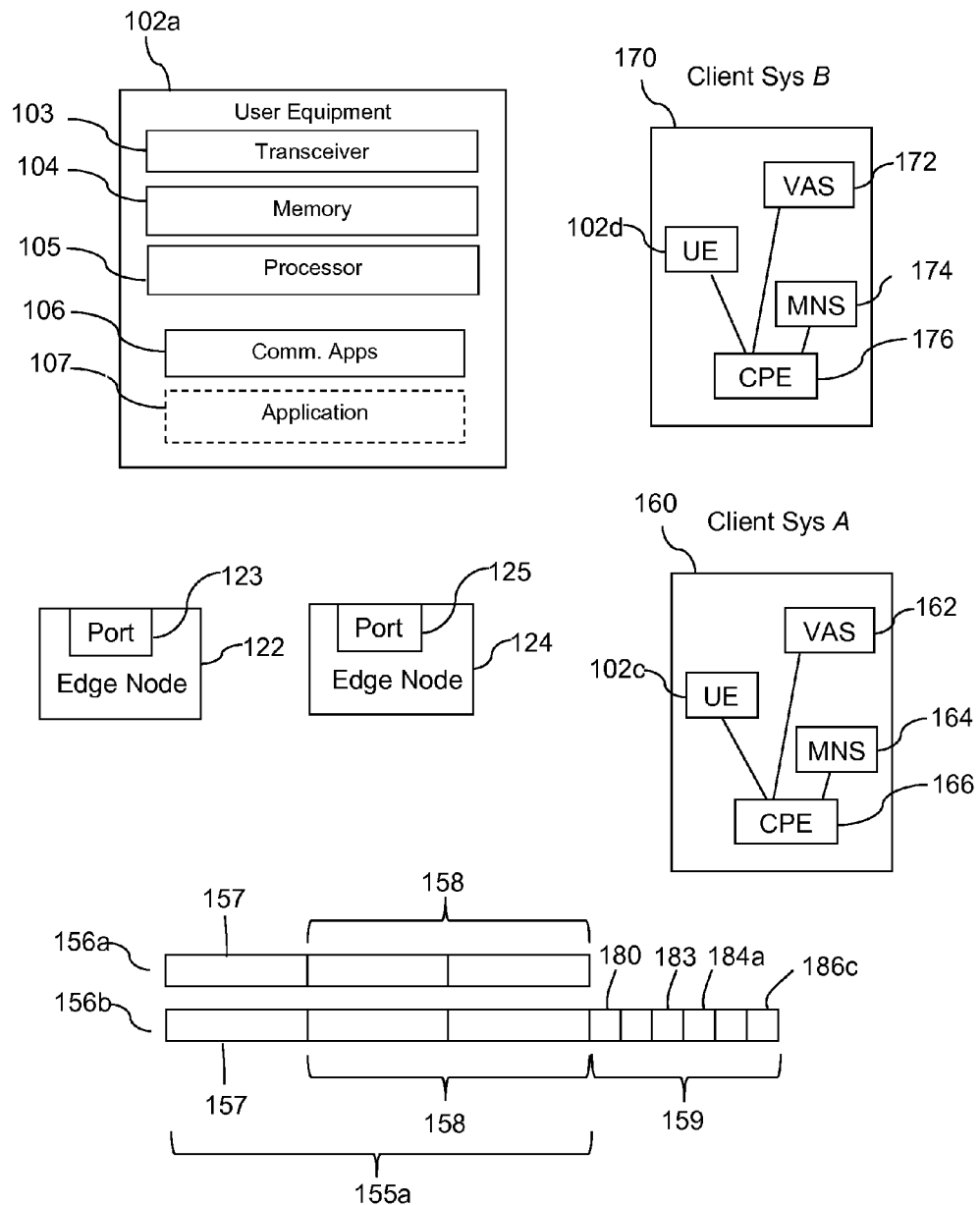
FIG. 1B illustrates user and network equipment and exemplary elements according to an embodiment of the disclosure.

Continuing with FIG. 1A with reference to FIG. 1B, the server system 130 may be in communication with UEs (e.g., 102a, 102b, etc.), data stores 150, 153, server 135, and client systems A and B (160, 170 respectively) using one or more network routing elements, such as represented by edge nodes 122, 124 and/or through network 108. It is understood that any number of routing elements can be used to route network communications within and from the service provider network 120. In an embodiment, Client system A 160 comprises UE 102c coupled to customer premise equipment (CPE) 166, which in turn may be coupled to edge node 124. An edge node (e.g., 122, 124) may be a router, access point, switch, or network element that comprises at least one port (e.g., 123, 125 respectively). In some contexts, instances of user equipment (e.g., 102a, 102b, 102c, 102d, etc.) may be referred to as a client based on the UE's association and/or use of the service provider network 120. A client system (e.g., 160, 170) may include locally coupled computer systems, UE's, and/or other network equipment that are directly and/or indirectly receiving services from the service provider network 120.

As illustrated in FIG. 1B, client system B 170 has a similar arrangement to client system A 160, however alternate embodiments may include one client system having more computer systems than another. In some embodiments, the client system A 160 and client system B 170 may correspond with different locations within a customer's business, where each system is physically proximate to each other or may be separated by a substantial distance. Each of the client systems (e.g., 160, 170) connected to the service provider network 120 may correspond with the same and/or different services provided by the network 120.

Embodiments of services provided by network 120 include network port access, value added services (VAS), managed network services (MNS), internet access, phone services, or other communication services in any combination. Port access includes physical entrances to the network 120 (e.g., through ports 123, 125) and the service provider may charge for such access, such as through recurring and/or usage-based pricing. A value added service (e.g., 162, 172) includes any of managed data services, managed security services, managed CPE services, web-based network manager, secure internet access through Internet Protocol Security (IPsec), remote access services, virtual systems, zone parameterization, and/or policy parameterization.

Remote access services allow for clients (e.g., 102a-102d) to remotely connect to service provider network 120 by building an IPsec to a gateway (e.g., edge nodes 122, 124). A virtual system service corresponds with a network based charge (i.e., not location dependent). Zone parameterization service provides zone parameters that are segments of service provider network 120 that are given security measures accessible to authorized devices. Thus, the client systems and/or devices therein may incur different charges depending on the zone parameters in place at a given period and depending on the custom mapping (e.g., 152) that is particular to a given customer. A policy parameter may be a network-based service providing information about source/destination IP addresses, ports, and/or protocols to pass through a firewall of the network 120. Information about policy and/or zone parameters may be stored in a header associated with an event instance (e.g., header 157 of event instance 155a as shown in FIG. 1B). A managed network service (e.g., 164, 174) includes any combination of communication services that provide support and implementation of multi-protocol wide area networks, local area networks, CPE routers, VPN devices, switches, hubs, servers, and applications over the service provider network 120. Fault management, network monitoring, and informational reporting about characteristics of network usage or performance may also be types of managed network services. Thus, the usage and associated charges may vary by location and based on the type of equipment is being used to support the subscription to the services.

Port and equipment utilization, for example, may be tracked by the service provider network 120 for the computer systems and other clients that are associated with a customer's subscription. As services (e.g., 162, 164, 172, and 174) are used by clients, the network 120 may generate data that is collected autonomously and compiled into raw invoice data, such as in the form of one or more network record 154 stored in records data store 153. This raw data may be pulled at a designated time and used for generating reports, such as an invoice or performance record. The data generated for network usage may be referred to as an event instance and stored in rows within network record 154. As discussed above, this data may grow in size over time as a history of events accrues and is stored by the service provider network 120. A customer, or employee of the customer, may desire to see only certain charges or information about network usage, but only for certain client systems or devices therein associated with the customer subscription. Thus, server system 130 is configured to provide dynamic generation and access of one or more custom network records (e.g., 147) over the network 120 through the clients. This capability by the particular machine may be marketed as a hierarchical bill reporting service.

A client includes hardware and/or software that is configured to access service provider network 120 and/or elements therein (e.g., via portal 138 which is discussed below) according to a corresponding subscription to services of network 120. For example, UE 102a may execute a communication application 106 (e.g., a web browser) that is stored in memory 104 (which includes non-transitory memory) and configures at least one processor 105 to communicate with eNB 110 using transceiver 103. Thus, UE 102a and its corresponding communication application 106 would be considered a client on the network 120. Similarly, computer systems and other equipment that are connected to service provider network 120 and associated with the customer may be considered clients of the network 120. In some embodiments, an application 107 may be separate from a web browser and provided by a service provider for access to service provider network 120 and/or portal 138 by configuring processor 105 and using application programming interfaces. As discussed further in FIG. 4, user equipment (e.g., any of 102a-102d) may be any of a server computer, a desktop computer, a laptop computer, a notebook computer, a tablet computer, a mobile phone, a personal digital assistant (PDA), a media player, a headset computer, a wearable computer, a game console, an Internet digital media streaming device, a television, or another network/communications capable device.

Figure 1C:
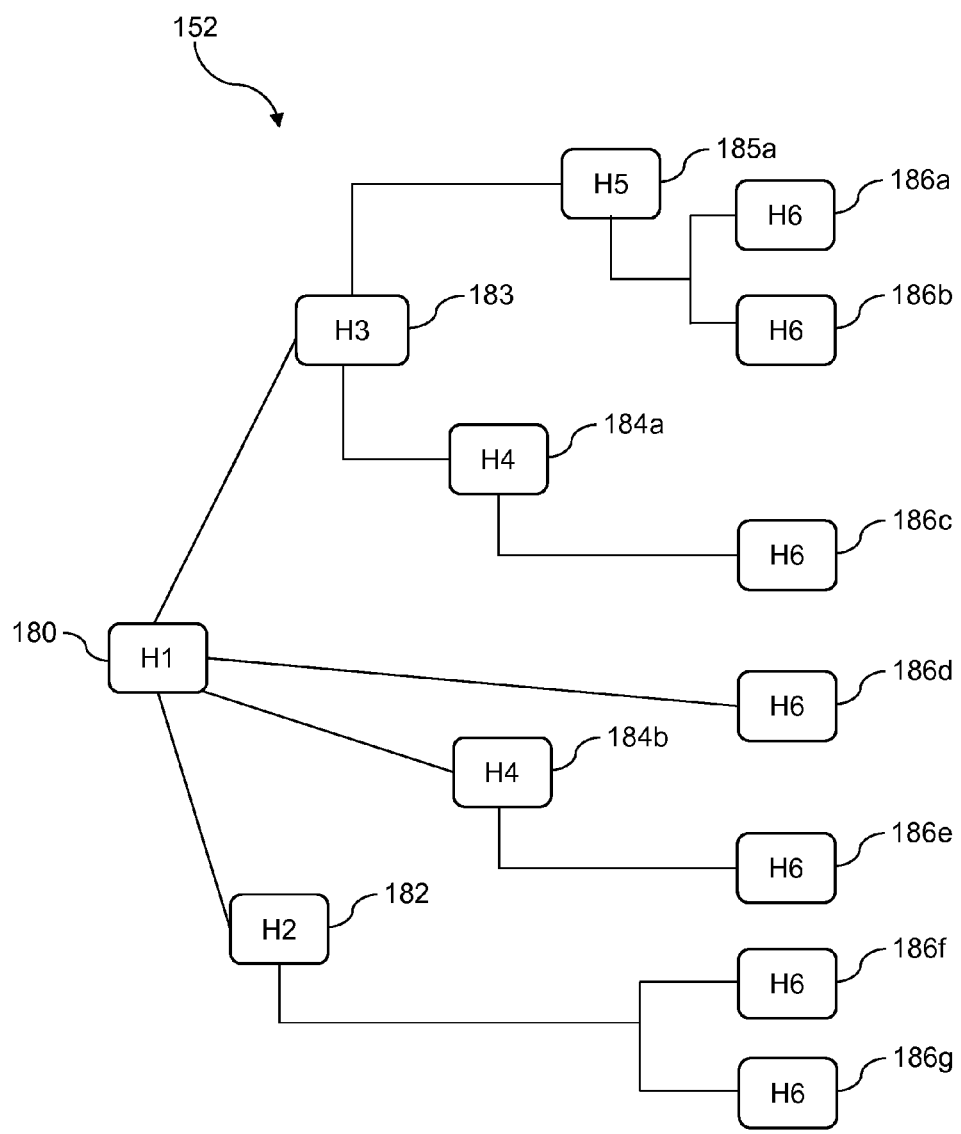
FIG. 1C illustrates an example of an element referenced in FIG. 1A and FIG. 1B according to an embodiment of the disclosure.

In an embodiment, the communication application 106 accesses web portal 138 that is hosted by web server 135. A web portal 138 may include a hosted web page and/or at least one web application that communicates with a client and allows for clients to log-in and initiate request messages for certain charges. In some embodiments, the portal 138 is configured by the web server 135 and/or server system 130 to provide dynamic network maps, obtain performance and network inventory reports, route information to clients for trouble ticketing, engage in hardware and/or software testing, and initiate change requests for communication services. Through the web portal 138, a client can use query parameters, which may include the use of Boolean operators, to create and save search criteria that is used by server system 130 to create custom network records 147 upon creation, or at a future time. Other examples of search criteria and/or query parameters include, without limitation, input designating a request for a certain type of communication service exceeding a calculated cost amount, a request for grouping multiple records or charges together, or request for a report that calculates the cost for all communication services minus the amount for taxes and courtesy discounts for a particular computer system. The customer may desire certain portions of their client systems to be billed separately, but still maintain associations with other systems in a custom manner. Simply stated, a parent corporation may have multiple subdivisions, and the customer wants certain types of charges to be shown separately and be able to isolate charges, accounts, locations, and/or services according to how they choose to organize their billing invoices. This may be accomplished through the generation and assembly of a custom mapping, such as shown in FIG. 1C. Thus, server system 130 may be configured by application 136 to initiate generation tool 140 upon a request from UE 102*a* via portal 138 for defining a unique hierarchy data structure through a custom mapping (e.g., custom mapping 152).

Turning to FIG. 1C with reference to FIG. 1A and FIG. 1B, an embodiment of a custom mapping 152 is illustrated. The server system is configured by the generation tool 140 in the assembly of the custom mapping 152, which is based on inputs from UE 102*a* via portal 138. Each customer's custom mapping structure may be unique and correspond with a client identifier. The server system 130 may use client identifiers to access, assemble, and manage custom mappings (e.g., 152) on a mapping data store 150. The custom mapping 152 defines a hierarchy data structure (hierarchy) comprising at least one top level and a plurality of sub-levels, where each level may include one or more instances of that level (level instances). In an embodiment, custom mapping 152 includes a hierarchy that is semi-nested and has non-uniform relationships between levels of the hierarchy. This may be referred to as the custom mapping non-uniformly defining a hierarchy data structure that is unique to a client identifier. Embodiments of custom mappings that define a hierarchy data structure non-uniformly and/or one that is semi-nested, such as illustrated in custom mapping 152, comprise level instances that may not necessarily depend on, nor correspond with, other level instances within the hierarchy in a uniform manner. Simply stated, each instance of a level can relate to another level in a parent-child relationship, but not all level instances have the same relationships between levels. This is easiest understood by the illustration of FIG. 1C.

For example, FIG. 1C shows six types of level instances marked as H1, H2, H3, H4, H5, H6, where H1 represents an instance of a top level, and H2-H6 represent instances of sub-levels. In the illustrated embodiment, generation tool 140 configures server system 130 based on inputs to define a data structure having level instance H1 180, which in turn corresponds with sub-levels at level instances: H2 182, H3 183, H4 184*b*, and H6 186*d*. Level instance H2 corresponds with level instances H6 186*f* and 186*g* at the sixth sub-level. H4 184*b* corresponds with H6 186*e*. H3 183 corresponds with a level instance H4 184*a* which in turn corresponds with H6 186*c*. H3 183 also corresponds with an instance of the fifth level at H5 185*a* that has corresponding sub-levels with level instances H6 186*a*, 186*b*. It is understood that the quantity of levels and corresponding instances in FIG. 1C are merely exemplary, and alternate embodiments may include any plurality of levels and corresponding instances that tier up to each other in a different manner.

When assembling custom mapping 152 in a data structure, the generation tool 140 may use mapping identifiers, such as through the use of flags in columns to define the overall layout of the hierarchy of the entire custom mapping 152. In some embodiments, each type of level (e.g., one of the six levels illustrated in custom mapping 152) may be associated with a type of particular network, subsidiary, division, account, location, and/or other client customized identifier for defining a relationship between the customer's network and information from network records used in customized reports and records (e.g., customized network record 147). Thus, some or all charges or other information for communication services may be invoiced together, separately, or in any combination thereof. The client identifier may be used by the server system 130 to identify which custom mapping to select within a data store. In some embodiments, a client identifier may be used to identify a portion of the custom mapping based on whether the client requesting the custom network record information is authorized to access the information.

A custom mapping (e.g., 152) allows the server system 130 to generate custom records, which is initiated using a client to select types of levels and designate query parameters through web portal 138. Once custom mapping 152 has been initially created, it may be saved in mapping data store 150. The server system 130 is configured by application 136 to receive a request from a client, such as UE 102*a* through portal 138. The server system 130 may refer to a client identifier in the request and use a lookup table to pull the corresponding custom mapping 152 that defines the entire hierarchy in a data structure. The dimensions of the data structure for the custom mapping 152 may be determined by the server system 130, and application 136 may call generation tool 140 to create the custom mapping 152 within each event instance of a network record. For example, records data store 153 may receive and store one or more network record 154 in non-transitory memory.

A network record 154 may be associated with usage of the service provider network 120 for communication services corresponding to a client subscription stored in memory 134. The network record 154 comprises a plurality of event instances, such as event instances 155*a*, 155*b*, through 155*n*. Each event instance is a row in a data structure of the network record 152 and initially does not reference any portion of a custom mapping (e.g., 152). For example, event instance 155*a* may include information related to client system A 160 for UE 102*c* usage of at least one of the services, such as a value added service 162 and/or managed network service 164. The request may indicate query parameters associated with raw information 158 included in at least event instance 155*a*, however, querying the entire records data store 153 for the raw information 158 may use a substantial amount of processing resources that strain accessibility of data store 153. In some embodiments, at least some event instances correspond with data structures that are dimensionally different from each other, and thus are disparate according to the server system 130. Thus, the present disclosure improves the performance and ability of server system 130 to process and efficiently route information that may or may not be disparate to each other in records data store 153. Further detail regarding raw information 158 and monitoring within a service provider network can be found in U.S. patent application Ser. No. 12/638,906, filed Dec. 16, 2009 by Brian Lushear et al., entitled "End-to-End Network Monitoring", which is incorporated herein by reference in its entirety.

The server system 130, in conjunction with application 136 and/or generation tool 140, creates the custom mapping 152 within each even instance (e.g., 155*a*) by creating data structure (e.g., 159) at the end of the row. As illustrated in FIG. 1B, an embodiment of event instance 155*a* shows that the original data structure 156*a* includes a header 157 and raw information 158, and thus does not have a reference to the custom mapping 152. Put simply, an event instance (e.g., 155*a*) that is initially generated and stored in data store 150 may actually be associated with an instance of a sub-level (e.g., any of H1 180, H3 183, H4 184*a*, H5 185*a*, and/or H6 186*c*) within custom mapping 152, but bears no demarcation within the event instance row (e.g., at 156*a*) that such association exists and thus does not identify how each of the event instances (e.g., 155*a*-155*n*) are ordered or relate amongst themselves. Because the illustrated embodiment of custom mapping 152 comprises six level instances, data structure 159 for the custom mapping 152 is respectively created with six columns where each column corresponds to each type of level, as shown at the end of the row in 156*b*. The custom mapping 152 created at each event instance may initially be empty—that is, without at least some portions of the unique hierarchy stored in columns at each row. When an event instance (e.g., 155*a*) includes the custom mapping 152 through data structure 159, it is built to accept a flag or some other mapping identifier that is recognized by server system 130 through application 136 and/or generation tool 140.

Responsive to creating the custom mapping (e.g., 152) at each event instance, the server system 130 generates the hierarchy by using data structure 159 while the network record is stored within data store 153. For example, the application 136 may parse information (e.g., routing and/or end point addresses) in a header (e.g., 157) associated with the corresponding event instance (e.g., 155*a*). This may be done for some or all event instances in the network record 154 by generating a flag and/or mapping identifier within one or more column of data structure 159. For example, event instance 156*b* illustrates the point in time which event instance 155*a* includes the custom mapping 152. In other words, the data structure 159 is the custom mapping 152 added to the event instance 155*a*. The illustrated row 156*b* shows an example where the first, third, fourth, and sixth columns of data structure 159 correspond with a portion of the hierarchy at level instances H1 80, H3 183, H4 184*a*, and H6 186*c*, respectively. Thus, the hierarchy corresponding to each particular event instance is generated within custom mapping 152 at each event instance through data structure 159. At least a portion of the of the information from the header (e.g., 157) may be correlated with custom mapping 152 by server system 130, and flags may be set in columns of data structure 159 to generate the hierarchy based on the header (e.g., 157).

After the network record 154 includes event instances that have the custom mapping created and corresponding portion of hierarchy generated in their row, server system 130 can initiate a parser that queries the network record using the flags set in data structure 159. The data structure (e.g., 159), which is the custom mapping (e.g., 152) created at each event instance and that may comprise flags in a particular arrangement corresponding to the hierarchy for that event instance (e.g., 155*a*), can be referred to as a dynamic network map. A plurality of event instances can be determined based on the hierarchy generated (e.g., the flags set in columns of data structure 159) and/or information from a request. In some embodiments, only the dynamic network map to determine which event instances from the network record 154 are included in the plurality that is relevant to the request received. In other words, only the flags of each column in the hierarchy generated at each event instance shown in data structure 159 may be queried.

In some embodiments, different event instances may include similar and/or the same raw information (e.g., 158), yet correspond with different level instances within custom mapping 152, thereby leading to duplicate entries. Thus, the parser of application 136 is aware of the entire hierarchy in custom mapping 152, and looks to the dynamic network map (e.g., through data structure 159). The server system 130 identifies duplicate event instances using the dynamic network map based on query parameters received in a request and flags of the columns in each row (e.g., columns in data structure 159). The server system 130 may also detect a change in the custom mapping 152 stored in mapping data store 150 and update the hierarchy at each event instance accordingly, thereby allowing data structure 159 to be dynamic. If multiple event instances are duplicates, the server system 130 will flag (i.e., mark for use and/or selection) one of the duplicates for inclusion in part of the plurality that will be used to make a customer network record (e.g., 147). One of the duplicate event instances may be chosen because it corresponds with a level instance that is at a higher level within the custom mapping 152. For example, if raw information between multiple event instances is determined to be a duplicate raw data but different regarding the dynamic network map, then the server system 130 may select one event instance that has a flag at the highest level instance below the top level.

The server system 130 may initiate staging tool 142 and generate staging table 146. Based on the determination using the custom mapping 152 and hierarchy generated at each event instance (i.e., the dynamic network map shown in data structure 159), the plurality of event instances may be pulled into the staging table 146. This may decrease the likelihood of session timeout at the web portal 138 and thus improve the functionality of the service provider network 120. The server system 130 may identify search criteria from a request and initiate one or more query modules of application 136 to query the staging table 146. In some embodiments, the search criteria referenced by the query modules may designate searching for information that is not currently present in the staging table 146 when initially pulled from network record 154. For example, a request may want to break down two types of charges for a particular location and also request that total cost show these two types added together.

Thus, to efficiently create a customer network record (e.g., 147), the server system 130 may isolate particular columns based on flags for the column in the staging table 146 and create one or more new columns to ensure that the staging table is not dimensionally disparate in size. The fields within the staging table can be concatenated by the server system 130 based on the request and the flags of the columns, and in response to pulling the plurality of event instances into the staging table 146. This generates the information within fields of the new column at one or more row in the staging table 146. The server system 130 may then specifically query the concatenated fields of the newly created columns based on a determined correlation with the request. The server system 130 may then compile results from the query and create a custom network record. The results and data from the query and/or created staging table 146 may not be permanent in nature. In some embodiments, the information pulled into the staging table 146 may be deleted at a time subsequent to creation of the custom network record 147 that fulfills the request. The server system 130 may analyze the request to determine whether a response should be routed directly to the client (e.g., UE 102*a*) or through portal 138 and web server 135. A dispatch tool 144 may be initiated and compress and/or segment the custom network record as determined so as to route the custom network record 147 to a client and thus mitigate the likelihood of session timeout over the network service provider 120. In some embodiments, a client may interact with portal 138 to request at least one more custom record, a plurality of custom network records concurrently, and/or alter custom mapping 152 stored in data store 150. The server system 130 can dynamically adapt to changes in custom mapping 152 stored in data store 150, and create another custom network record as requested.

Figure 2A:
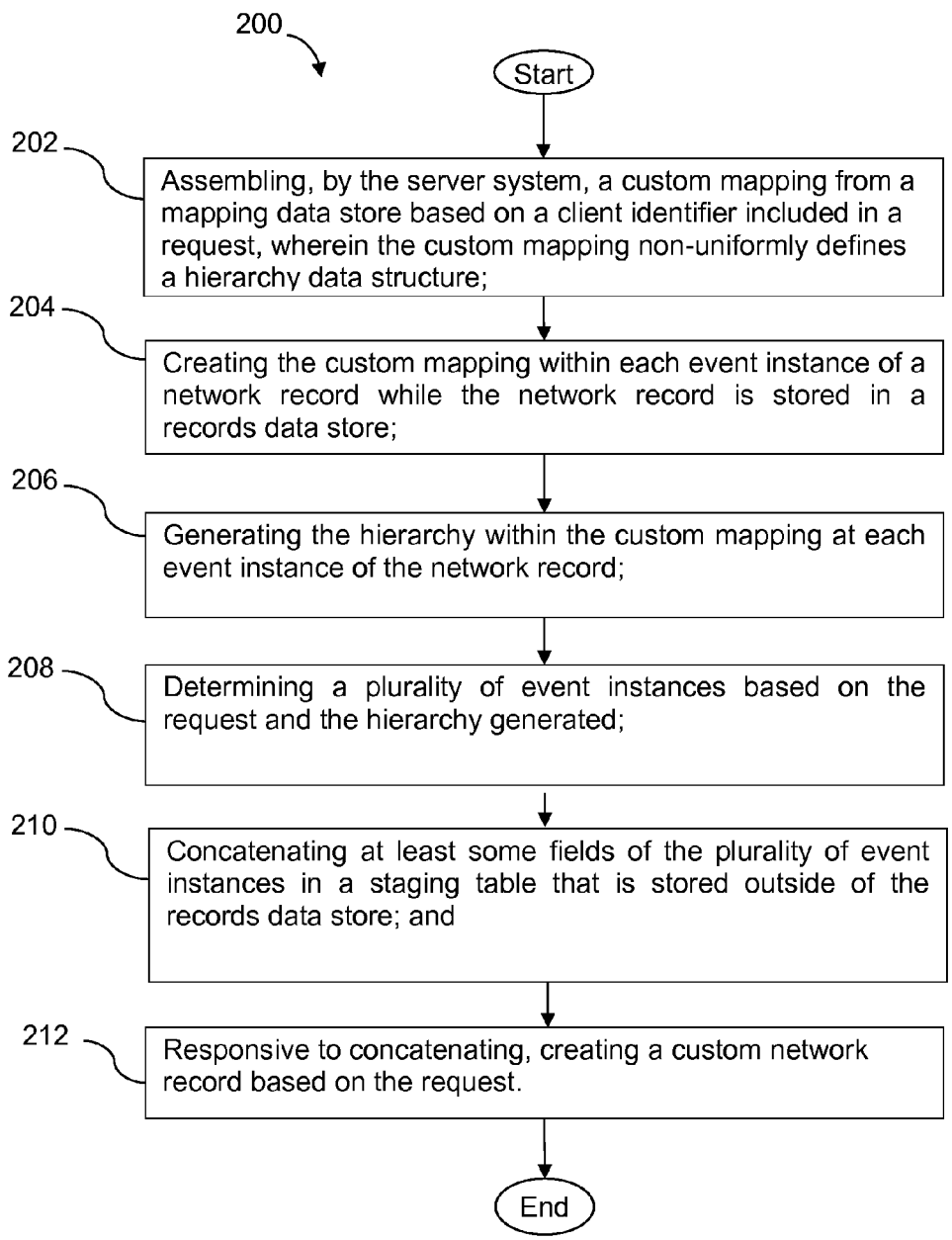
FIG. 2A is a flow chart of a method according to an embodiment of the disclosure.
Figure 2B:
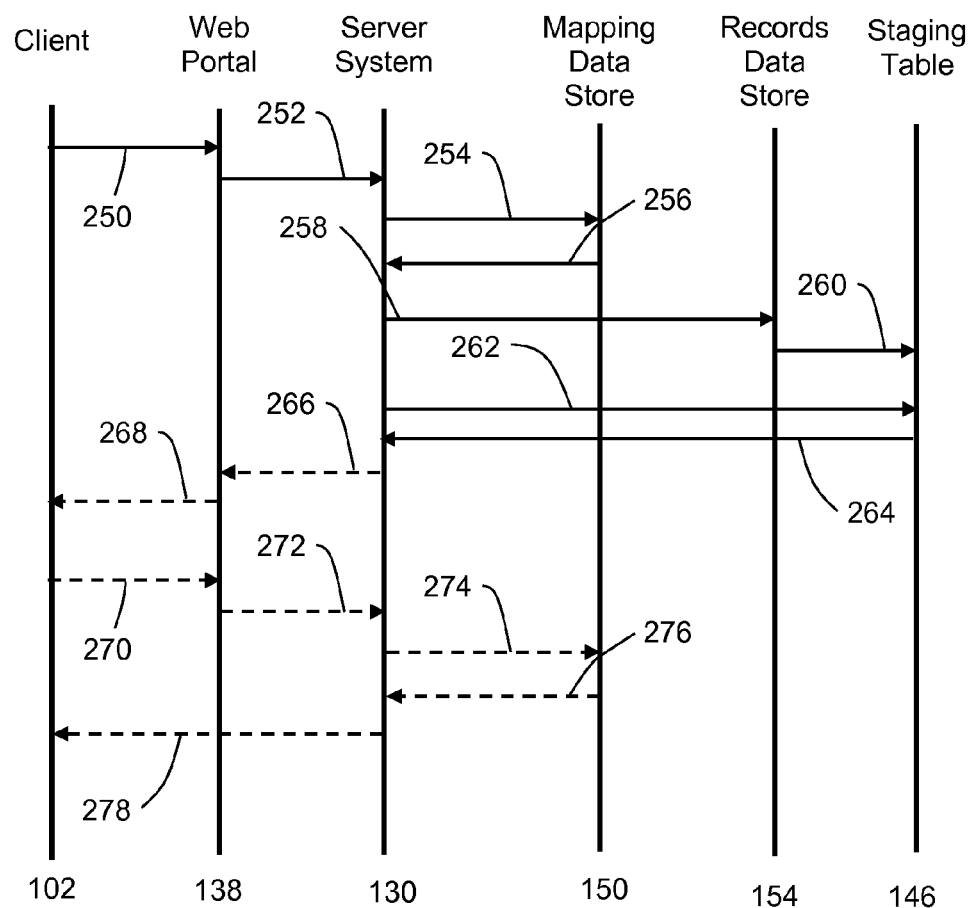
FIG. 2B is a chart illustrating a message flow according to an embodiment of the disclosure.

Turning now to FIG. 2A and FIG. 2B with reference to FIGS. 1A, 1B, and 1C, a method 200 is described. At block 202, the server system 130 assembles a custom mapping (e.g., 152) in mapping data store 150. This may be initiated based on input 250 from a client (e.g., any of UE 102's a-d)

to web portal 138 via service provider network 120 and/or network 108. The input 250 may include search criteria and/or query parameters. The web portal 138 may receive the input 250 and add a client identifier based on the input, and send a request 252 to server system 130. The server system 130 may initiate assembly for storage and maintenance in a non-transitory memory of mapping data store 150 through relay of a creation message 254. As discussed above (e.g., with the discussion of FIG. 1C), the custom mapping may not have uniform relationships between level instances and thus non-uniformly defines a hierarchy data structure. Once assembled, the mapping data store 150 may send a reply 256 in response to the creation message 254 indicating that input 250 from client 102 was implemented in a custom mapping (e.g., 152) stored therein. The server system 130 may parse query parameters included in the request 252 and determine level instances corresponding to the custom mapping 152 stored in mapping data store 150 based on the query parameters.

At block 204, the server system 130 accesses records data store 153 via message 258 to handle one or more network records (e.g., 154). The server system 130 creates a custom mapping within each event instance of the network record while the network record is stored in records database 154. At step 206, the method includes generating the hierarchy within the custom mapping at each even instance of the network record. The server system 130 may parse headers associated with event instances and generate a dynamic network map at each event instance—that is, generate the hierarchy pertaining to the particular event instance within the custom mapping created at each row. In some embodiments, the server system 130 identifies duplicate event instances based on query parameters included in request 252 and the level instances of the hierarchy that were generated in the dynamic network map for that particular event instance. If duplicates are identified, the server system may flag and/or mark one of the event instances from among the duplicates that corresponds with a level instance that is at a higher level within the custom mapping (e.g., 152) based on a determination of the query parameters from request 252. As discussed in FIGS. 1A-1C, each event instance includes a row in a data structure of network records in data store 153. The event instances may be generated by network elements of the service provider network 120, however, the network elements are not aware of the custom mapping 152 in mapping data store 150, and thus the network records in data store 153 do not initially comprise, and thus are without reference to, at least some of the information of the custom mapping 152 associated with the client identifier.

At block 208, the server system 130, while accessing records data store 153, determines a plurality of event instances—which may be a selected group—based on the request 252 and the hierarchy generated which is custom to each event instance. An instance of the selected group may be pulled while leaving the original information in the network record stored in data store 153. The selected group maybe pulled in a message 260 to staging table 146. The staging table 146 may be generated by staging tool 142 and/or application 136 by at least one core of processor 132. In an embodiment, the server system 130 may analyze the dimensions of the data structure of the selected group and may determine that some of the data structures are dimensionally disparate. The server system may create additional columns to remove any disparity in dimensions and thus allow for efficient query and processing in the staging table. The data structure of the selected group pulled into staging table 146 may include rows and columns and comprise fields therein. It is understood that the staging table 146 is separate from, and stored outside of, the records data store 153 in order to minimize the likelihood of session timeout of a communication link.

At block 210, the server system 130 may concatenate at least some fields of the selected group for the plurality of event instances, which may be based on the request 252 received. For example, the request may indicate that information related to network usage and/or charges stored in the event instances should be combined, but that the values should not reflect taxes or other additional fees. Thus, fields pertaining to the requested information are concatenated, and calculations are performed autonomously for the creation and population into new fields of newly created columns in the staging table. A query of the information that completely fulfils the request is not performed within records data store 153 because of the millions of event instances stored therein. A client subscription may include a data structure and is associated with a plurality of telecommunication services (e.g., value added services 162, 172, managed network services 164, 174, and/or other services discussed herein) provided on the service provider network 120.

At block 212, the server system initiates creation of a custom network record based on the request 252 and in response to the information discussed above (e.g., related to concatenating) being in the staging table 146. The server system 130 may initiate one or more query modules based on analysis of the query parameters of request 252. A message 262 queries the staging table using at least one of the query modules and information satisfying the request. The server system compiles and/or creates one or more custom network records based on information received in message 264 from staging table 146. In some embodiments, the server system 130 then routes the custom network record to web portal 138 in a routing message 266 via at least service provider network 120. A web server 135 hosting web portal 138 may send a relay message 268 to client 102.

In some embodiments, the server system 130 may initiate dispatch tool 144 on a back-end server comprised therein and compress at least one custom network record for transport over the service provider network 120. The compressed file may be provided to web server 135, which decompresses the compressed custom network record and hands it off to client 102, such as through a communication application 106 accessing client portal 136.

In an embodiment, the client may provide a second (another, different, and/or separate) input 270 to web portal 138. This input 270 may include a request to change some or all of custom mapping 152 stored in mapping data store 150, a request for another custom network record based on different query parameters and search criteria (e.g., over a different time period related to an invoice or charges), or some combination thereof. In an embodiment where request 270 relates to a change in the custom mapping structure 152, the web portal identifies the request for a change associated with some aspect of the mapping structure 152 and sends a message 272 to server system 130 to change, update, and/or create another custom mapping. The server system 130 may initiate generation tool 140 and access mapping data store 150 via a communication message 274. A change, update, alteration to custom mapping 152 may be performed by server system 130, and/or a new custom mapping may be created based on the input 270. The mapping data store 150 may, at a time subsequent to the message 274, provide some or all of the new custom mapping (or alteration, etc.) in message 276 to server system 130. This may be related through web portal 138 to client 102 in a message 278. The client may be configured by the message 278 and include displaying the newly created custom mapping to provide and fulfill the request 272 based on input 270. This occurs prior to session timeout of the communication links between the devices and elements discussed herein.

Figure 3:
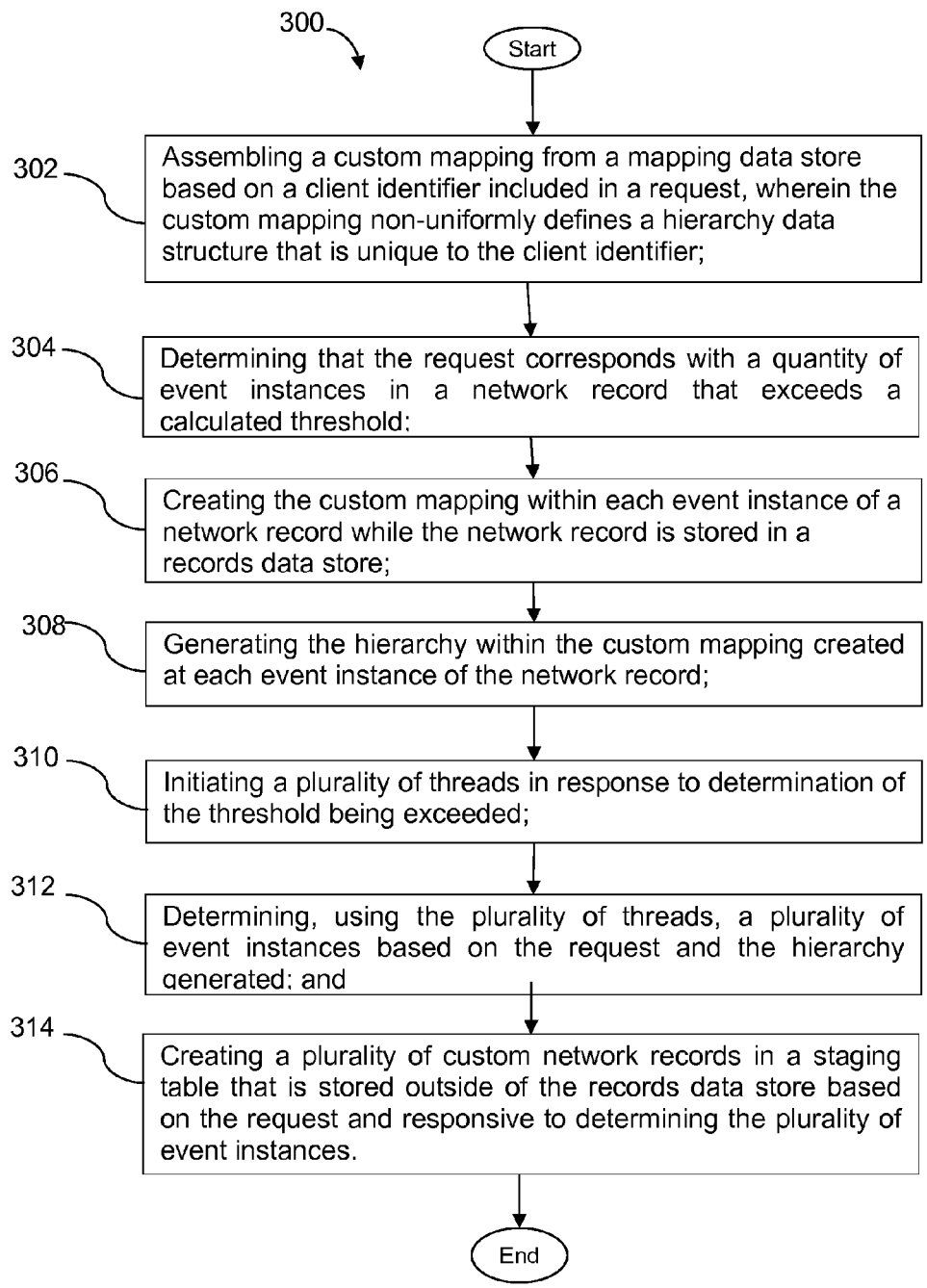
FIG. 3 is a flow chart of another method according to an embodiment of the disclosure.

Turning now to FIG. 3, with reference to FIGS. 1A-1C, a method 300 is described. The method 300 allows for dynamic creation and routing of custom network records with a server system (e.g., 130) on a service provider network (e.g., 120) before session timeout of a communication link occurs. At block 302 the server system assembles a custom mapping from a mapping data store based on a client identifier included in a request. The custom mapping may non-uniformly define a hierarchy data structure that is unique to the client identifier, which is associated with a customer subscription.

At block 304, the server system 130 may determine that the request corresponds with a quantity of event instances in a network record stored in records data store 154, where the quantity of event instances exceeds a calculated threshold. The calculated threshold may be at least one of one hundred thousand rows, five hundred thousand rows, one million rows, ten million rows, one hundred million rows or some other number of rows. The threshold may be calculated based on session timeout associated with communications between a client which corresponds to the request received by the server system 130. Some embodiments of a session timeout relate to passage of a predefined time interval, such as 10 seconds, 30 seconds, 60 seconds, 180 seconds, any number in between, or designated by the service provider network and/or web server. The time internal may be approximate, and be within 5% of the predefined time interval.

At block 306, the server system 130 may initiate generation tool 140 that creates the custom mapping within each event instance of the network record. At block 308, the hierarchy pertaining to the information of the event instances is created at each event instance of the network record. Each event instance comprises a header having information correlating to at least one level instance of the data structure. Generation of the hierarchy for that particular event instance in the custom mapping created at that row of the event instance may be based on the information comprised in the respective header.

At block 310, the server system 130 may initiate a plurality of threads in response to determination of the threshold being exceeded. The plurality of threads may include information from application 136 to process the request received from a client via web portal 138. In an embodiment, for at least one of the threads initiated, the server system may identify duplicate event instances based on the creation of the custom mapping at the row of the event instance and hierarchy generated therein. That is, the raw information (e.g., 158) of the event instances may include duplicate information, and is identified through the hierarchy and/or header information at each event instance. In an embodiment where a duplicate is identified using at least one thread, the server system 130 may select one of the event instances from the duplicates that corresponds with a higher level within the custom mapping. The selection may be based on a determination of the query parameters.

At block 312, the server system 130 uses the plurality of threads to determine a plurality of event instances based on the request and the hierarchy generated at each event instance. This may be based on determination of the levels (i.e., level instances) associated with query parameters included in the request. In an embodiment, the selected plurality of event instances may be pulled into a staging table outside the records data store. The selected plurality of event instances may be queries based on the request, and relevant information extracted based on the queries.

At block 314, the server system creates a plurality of custom network records in a staging table based on the request and responsive to determining that the plurality of event instances fulfill the information requested. A plurality of custom network records may be created in place of one because of the calculated threshold and likelihood of possible session timeout. In an embodiment, each of the plurality of custom network records may be compressed by a back-end server of the server system 130. The server system 130 may route at least one of the plurality of custom network records directly to a client (i.e., route apart from the web portal 138) and/or route at least one of the plurality of custom network records to web portal 138. The web server hosting the web portal 138 may decompress any compressed custom network records received from server system 130, and relay them to the client (e.g., UE's 102a-d) via portal 138. Therefore, the process improves the functioning of the service provider network by reducing the possibility of session timeout and increasing the processing speed of network elements to fulfil requests from clients attached to the service provider network.

Figure 4:
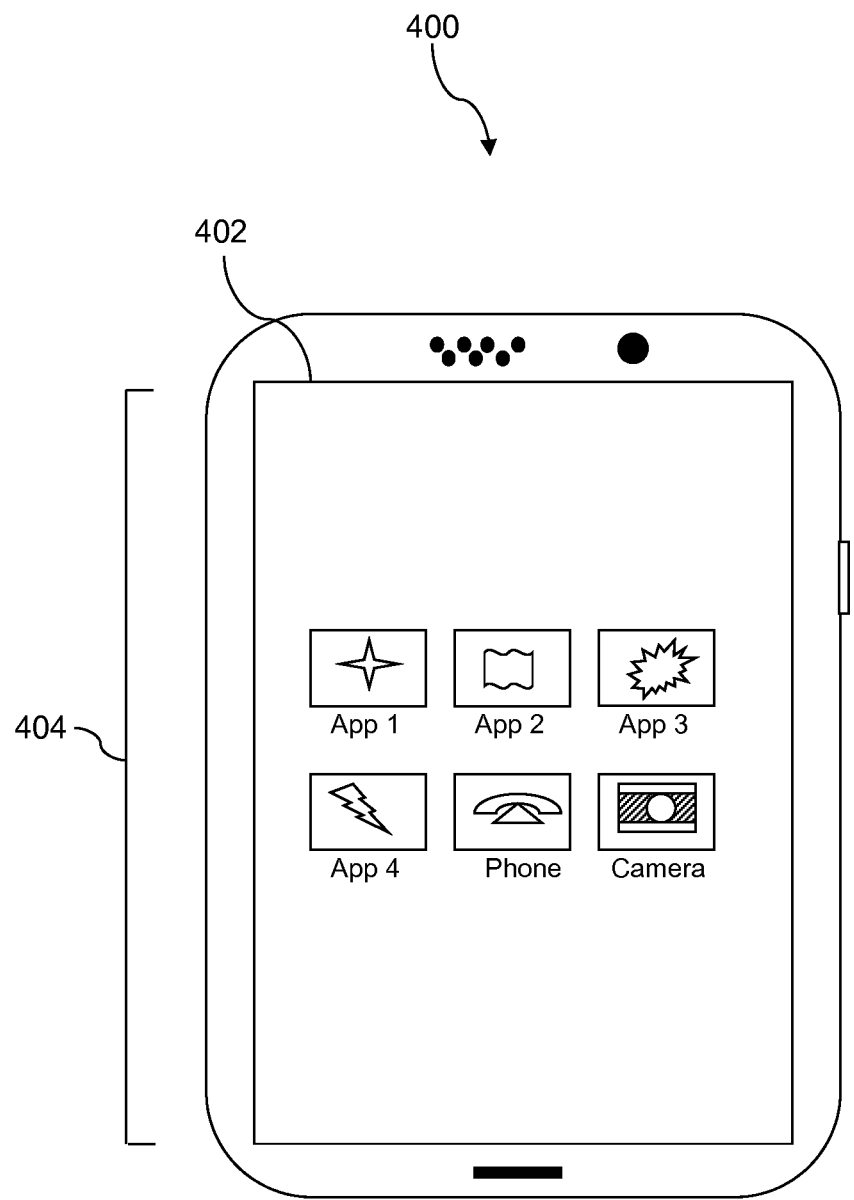
FIG. 4 is an illustration of a user equipment according to an embodiment of the disclosure.

FIG. 4 depicts the user equipment (UE) 400, which is operable for implementing aspects of the present disclosure, but the present disclosure should not be limited to these implementations. For example, UE 400 discussed herein may be embodiments of a client and/or UE's 102a-102d illustrated in FIGS. 1A and 1B. Though illustrated as a mobile phone, a UE (e.g., 400) may take various forms including a wireless handset, server computer, a desktop computer, a laptop computer, a notebook computer, a tablet computer, a mobile phone, a personal digital assistant (PDA), a media player, a headset computer, a wearable computer, a game console, an Internet digital media streaming device, a television, or another network/communications capable device. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with an eNB (e.g., eNB 110), a wireless network access node, a peer UE 400 or any other wireless communication network or system (e.g., network 108 and/or service provider network 120).

Figure 5:
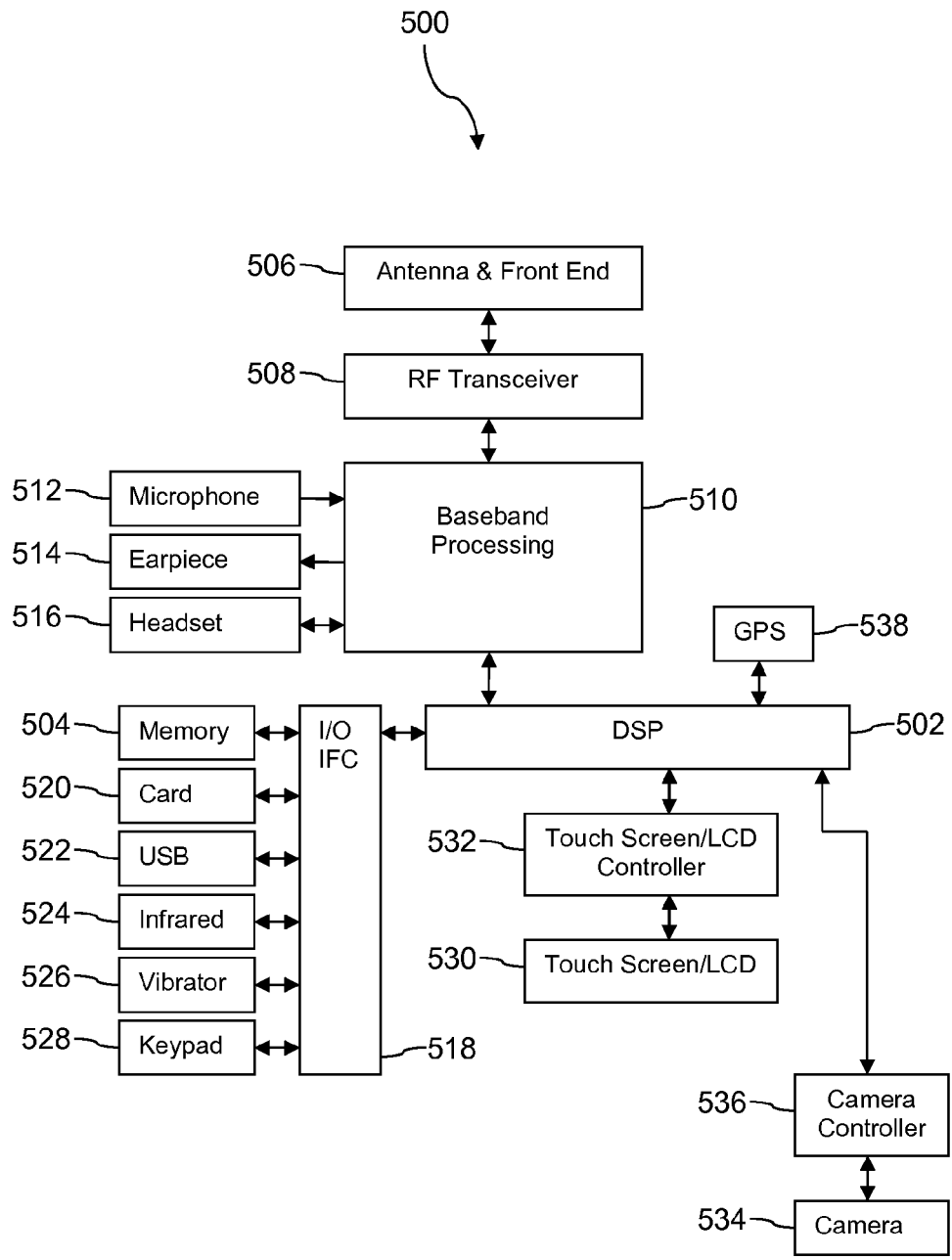
FIG. 5 is a block diagram of a user equipment according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508 (which includes long-range and short range components), a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, one or more camera 534 (coupled to a surface), a camera controller 536, and a global positioning system (GPS) receiver 538. In an embodiment, the UE 400 may include another kind of display that does not provide a touch sensitive screen and/or provides gesture controls through the plurality of elements discussed herein. In an embodiment, the UE 400 may include both the touch screen display 530 and additional display component that does not provide a touch sensitive screen. The touch screen display 530 includes touch screen 402. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer, network element, or other computer system. The infrared port 524 and other optional ports such as a Bluetooth® interface or an IEEE 802.11 compliant wireless interface may enable the UE 400 to communicate wirelessly with other nearby handsets and/or wireless node (e.g., a base station and/or eNB). In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may include a keypad and couple to the DSP 502 via the input/output interface 518 to provide one mechanism for the user to provide input to the UE 400. A keyboard may be a physical medium, virtual interface, or a combination thereof. Alternatively, one or more of the switches 528 may be coupled to a motherboard of the UE 400 and/or to components of the UE 400 via a different path (e.g., not via the input/output interface 518), for example coupled to a power control circuit (which may comprise a power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE (e.g., 400, 102a-102d) to determine its position.

Figure 6A:
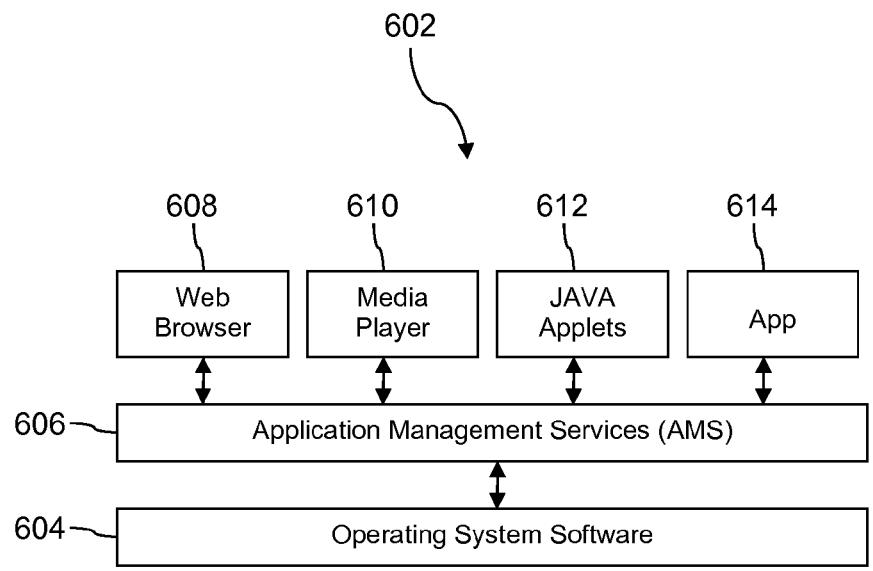
FIG. 6A is a block diagram of a software architecture for a user equipment according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400 and/or UE's 102a-102d in FIGS. 1A-1B. Also shown in FIG. 6A are a web browser application 608, a media player application 610, and JAVA applets 612. The web browser application 608 may be executed by the UE 400 and/or UE's 102a-102d in FIGS. 1A-1B to browse content of a network (e.g., service provider network 120 via portal 138) and/or the Internet (e.g., network 108), for example when the UE 400 and/or UE's 102a-102d in FIGS. 1A-1B is coupled to a network (e.g., network 108) via a wireless link. The web browser application 608 may permit a client to enter information into forms and select links to retrieve and view web pages. The web browser 608 may comprise portlets and/or applets that are provided by a web server (e.g., 135) and/or portal (e.g., 138). At least one communication application 106 and/or application 107 discussed in FIG. 1B may include a web browser (e.g., 608) and/or application 614 that interacts with AMS 606, which in turn may provide for communication with a web server (e.g., 135) and/or portal (e.g. 138). The media player application 610 may be executed by the UE 400 and/or UE's 102a-102d to play audio or audiovisual media. The JAVA applets 612 may be executed by the UE 400 and/or UE's 102a-102d to provide a variety of functionality including games, utilities, and other functionality.

Figure 6B:
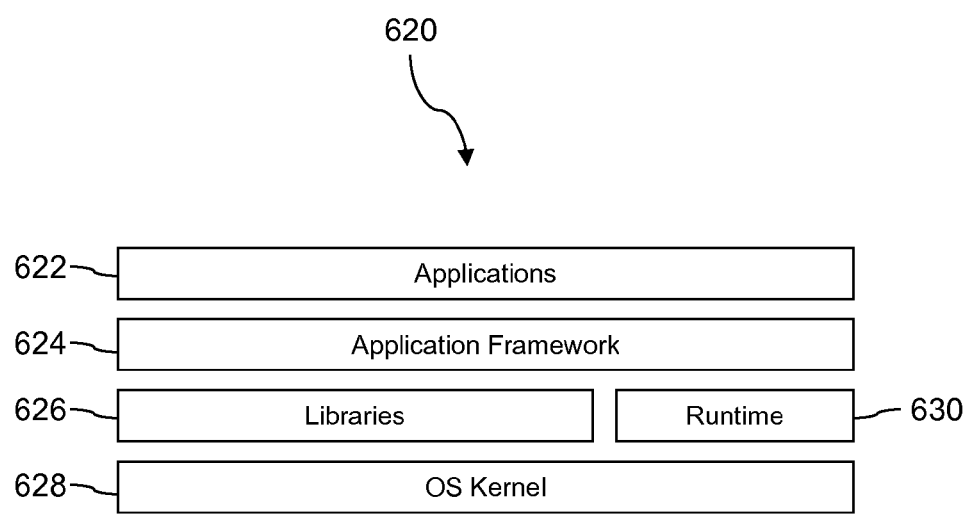
FIG. 6B is a block diagram of another software architecture according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626. For example, applications 622 may include applications 404 discussed in FIG. 4, and communication application 106 and application 107 discussed in FIG. 1B.

Figure 7:
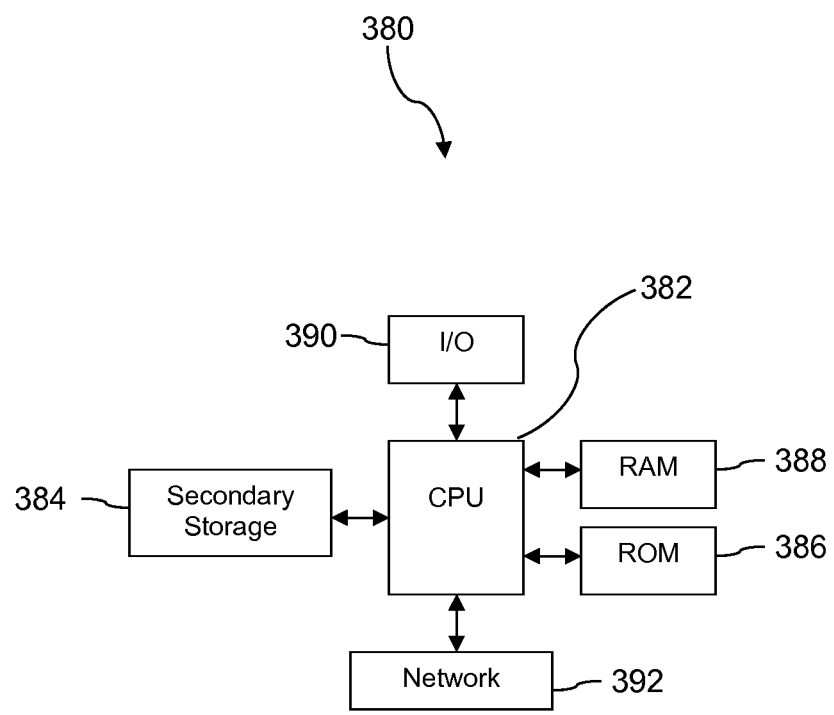
FIG. 7 illustrates a computer system suitable for implementing the several embodiments of the disclosure.

FIG. 7 illustrates a computer system 380 suitable for implementing one or more embodiments disclosed herein.

For example, the computer system 380 may be used to implement any of the network components and/or elements, including a server. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementations in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer, which is a particular machine and/or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, routers, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (Wi-MAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes, and is configured by, instructions, codes, computer programs, scripts which it accesses from hard disk, optical disk (these various disk based systems may all be considered secondary storage 984), flash drive, ROM 386, RAM 388, or the network connectivity devices 392. While only one processor 382 is shown, it is understood that any number of processors may be present and each processor may include one or more cores. Thus, while instructions may be discussed as executed by a processor, the instructions may be executed simultaneously, serially, or otherwise executed by one or multiple processors and/or cores therein through the use of threads. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some networking interface, device, or intermediate component, whether electrically, mechanically, communicatively, or otherwise. Other examples of changes, substitutions, and alterations are ascertainable by one skilled in the art and could be made without departing from the spirit and scope disclosed herein.

What is claimed is:

1. A method for dynamically creating and routing custom network records on a service provider network before session timeout, each step in the method performed by a server system, the method comprising:

receiving a request from a customer via a communication session;

assembling a custom mapping from a mapping data store based on a client identifier included in the request, wherein the custom mapping non-uniformly defines a hierarchy data structure that is unique to the client identifier;

determining that the request corresponds with a quantity of event instances in a network record that exceeds a calculated threshold;

creating the custom mapping within each event instance of the network record while the network record is stored in a records data store;

generating the hierarchy within the custom mapping created at each event instance of the network record;

initiating a plurality of threads in response to determination of the calculated threshold being exceeded;

determining using the plurality of threads, a plurality of event instances based on the request and the hierarchy generated;

pulling the plurality of event instances into a staging table that is stored outside of the records data store;

isolating at least one column in the staging table and creating at least one new column in the staging table;

concatenating at least some fields of the plurality of event instances in the staging table to generate information within fields of the at least one new column at one or more rows in the staging table;

querying the staging table including the concatenated fields of the at least one new column based on the request;

creating a plurality of custom network records in the staging table based on the querying and responsive to determining the plurality of event instances; and providing one or more of the plurality of custom network records to the customer before the communication session expires.

2. The method of claim 1, further comprising:
routing each of the plurality of custom network records to a web portal associated with the request, wherein each of the plurality of custom network records comprises information associated with usage of the service provider network.

3. The method of claim 1, the method further comprising:
determining levels of the hierarchy associated with query parameters included in the request;

for at least one thread initiated, identifying duplicate event instances based on the query parameters and the levels at each event instance; and responsive to the identification of duplicates by the at least one thread initiated, selecting one event instance from the duplicates that corresponds with a higher level determined from the query parameters.

4. The method of claim 1, wherein each event instance comprises a header having information correlating to at least one level of the data structure, and wherein generating the hierarchy at each event instance is based on the header.

5. The method of claim 4, further comprising:
compressing the plurality of custom network records by a back-end server of the server system at the service provider network; and providing, to a web server, at least one of the plurality of custom network records that are compressed from the back-end server, wherein the web server decompresses the at least one of the plurality of compressed custom network records and provides the at least one of the plurality of custom network records to a client associated with the customer.

6. The method of claim 1, wherein the calculated threshold is calculated based on session timeout associated with the communication session.

7. A system for dynamically creating and routing custom network records on a service provider network before session timeout, the system comprising:

a server system, at the service provider network, comprising a processor communicatively coupled to a non-transitory memory storing an application that, upon execution by the processor, configures at least the server system to:

receiving a request from a customer via a communication session, assemble a custom mapping from a mapping data store based on a client identifier included in the request, wherein the custom mapping non-uniformly defines a hierarchy data structure, determine that the request corresponds with a quantity of event instances in a network record that exceeds a calculated threshold, wherein the calculated threshold is related to the communication session length, create the custom mapping within each event instance of the network record while the network record is stored in a records data store, generate the hierarchy within the custom mapping at each event instance of the network record, in response to the determination of the calculated threshold being exceeded, determine a plurality of event instances based on the hierarchy generated and the request, pull the plurality of event instances into a staging table that is stored outside of the records data store, isolate at least one column in the staging table and creating at least one new column in the staging table, concatenate at least some fields of the plurality of event instances in the staging table to generate information within fields of the at least one new column at one or more rows in the staging table, query the staging table including the concatenated fields of the at least one new column based on the request, create a custom network record in the staging table based on the querying, and provide the custom network record to the customer before the communication session expires.

8. The system of claim 7, wherein the records data store stores a plurality of network records that are associated with usage of the service provider network by client systems corresponding to a client subscription, and wherein the client subscription is stored in the non-transitory memory coupled to the server system and is associated with a plurality of telecommunications services provided on the service provider network.

9. The system of claim 7, wherein each event instance includes a row in a data structure of the network record, and wherein each event instance is generated on the service provider network without reference to the custom mapping associated with the client identifier.

10. The system of claim 7, wherein each event instance corresponds with a plurality of levels of the hierarchy, and wherein generation of the hierarchy instantiates levels of the hierarchy within the custom mapping created at each event instance.

11. The system of claim 10, wherein the server system further configures at least the processor to:
parse query parameters included in the request,
determine levels of the hierarchy associated with the query parameters,
identify duplicate event instances based on the query parameters and the levels at each event instance, and
responsive to the identification of duplicates, flag one event instance from the duplicates that corresponds with a higher level determined from the query parameters.

12. The system of claim 7, wherein the server system further configures a processor to:
route, via the service provider network, the custom network record to a web portal that is accessed by executing a client.

13. A method for dynamically creating and routing custom network records on a service provider network before session timeout, each step in the method performed by a server system, the method comprising:

receiving a request from a customer via a communication session;

assembling a custom mapping from a mapping data store based on a client identifier included in the request, wherein the custom mapping non-uniformly defines a hierarchy data structure;

determining that the request corresponds with a quantity of event instances in a network record that exceeds a calculated threshold, wherein the calculated threshold is related to the communication session length;

creating the custom mapping within each event instance of the network record while the network record is stored in a records data store;

generating the hierarchy within the custom mapping at each event instance of the network record;

in response to the determination of the calculated threshold being exceeded, determining a plurality of event instances based on the request and the hierarchy generated;

pulling the plurality of event instances into a staging table that is stored outside of the records data store;

isolating at least one column in the staging table and creating at least one new column in the staging table;

concatenating at least some fields of the plurality of event instances in the staging table to generate information within fields of the at least one new column at one or more rows in the staging table;

querying the staging table including the concatenated fields of the at least one new column based on the request;

creating a custom network record in the staging table based on the querying; and providing the custom network record to the customer before the communication session expires.

14. The method of claim 13, further comprising:
parsing query parameters included in the request;
determining levels of the hierarchy associated with the query parameters;
identifying, within the network record while stored in the records data store, duplicate event instances based on query parameters and the levels at each event instance; and
responsive to identifying duplicates, flagging one event instance from the duplicates that corresponds with a higher level determined from the query parameters.

15. The method of claim 13, further comprising:
routing, via the service provider network, the custom network record to a web portal that is accessed by executing a client.

16. The method of claim 15, wherein routing comprises:
compressing the custom network record by a back-end server of the server system at the service provider network based on the query parameters; and
providing, to a web server, the custom network record that is compressed from the back-end server, wherein the web server decompresses the compressed custom network record and provides the custom network record to the client associated with the customer prior to session timeout.

17. The method of claim 13, wherein each event instance includes a row in a data structure of the network record, and wherein event instances are generated by the service provider network without reference to the custom mapping associated with the client identifier.

18. The method of claim 13, wherein determining the plurality of event instances uses the hierarchy generated within the custom mapping at each event instance, and wherein determining the set of event instances does not query event instance for information that completely fulfills the request while the network record is stored in the records data store.

19. The method of claim 13, wherein the records data store stores a plurality of network records that are associated with usage of the service provider network by client systems corresponding to a client subscription, and wherein the client subscription is stored in a non-transitory memory coupled to the server system and is associated with a plurality of telecommunications services provided on the service provider network.

* * * * *